United States Patent
Martin et al.

(10) Patent No.: US 8,645,867 B2
(45) Date of Patent: Feb. 4, 2014

(54) MODIFYING TIME ASSOCIATED WITH DIGITAL MEDIA ITEMS

(75) Inventors: Timothy B. Martin, Sunnyvale, CA (US); Gregory Charles Lindley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1170 days.

(21) Appl. No.: 12/107,708

(22) Filed: Apr. 22, 2008

(65) Prior Publication Data

US 2009/0265647 A1 Oct. 22, 2009

(51) Int. Cl.
*G06F 3/0481* (2013.01)

(52) U.S. Cl.
USPC ........... 715/839; 715/204; 715/721; 715/772; 715/855

(58) Field of Classification Search
USPC ......... 715/721, 230, 835, 838, 840, 968, 204, 715/772, 839, 855
See application file for complete search history.

(56) References Cited

U.S. PATENT DOCUMENTS

| | | | |
|---|---|---|---|
| 6,883,146 B2* | 4/2005 | Prabhu et al. | 715/854 |
| 7,007,243 B2* | 2/2006 | Baldino | 715/853 |
| 7,096,211 B2* | 8/2006 | Fujihara | 706/58 |
| 7,546,532 B1* | 6/2009 | Nichols et al. | 715/716 |
| 2004/0218894 A1 | 11/2004 | Harville et al. | |
| 2006/0277027 A1* | 12/2006 | Mann et al. | 703/25 |

OTHER PUBLICATIONS

U.S. Non-Final Office Action issued in U.S. Appl. No. 12/118,602 mailed Jun. 9, 2011.

* cited by examiner

*Primary Examiner* — Namitha Pillai
(74) *Attorney, Agent, or Firm* — Wong, Cabello, Lutsch, Rutherford & Brucculeri, LLP (57) ABSTRACT

A computer-implemented method includes displaying multiple content items in a user interface, where each content item has an initial time value. Input is received to modify time values of the multiple content items. Input of a new time value for a content item of the multiple content items is also received. A change amount value is determined based on the difference between an initial time value of the content item and the new time value. For each content item, the initial time value is modified to a different time value by applying the change amount value to the initial time value.

27 Claims, 6 Drawing Sheets

MODIFYING TIME ASSOCIATED WITH DIGITAL MEDIA ITEMS

TECHNICAL FIELD

This disclosure relates to software applications for managing content such as images, video, audio, and the like.

BACKGROUND

Software applications can edit content items such as images, video, audio, documents, and the like. Content items, such as images, can be captured using devices such as digital cameras, stored as images files, e.g., in JPG format, and transferred to storage devices. A software application can receive an image stored in a storage device and display the image on a display device of a computer system. Devices used to capture content can associate time with an item of content, e.g., the time when the item was captured, based on time settings programmed into the device. When the software application receives the captured items of content from the device, the time associated with the item of content is included in the metadata characterizing the image, where the metadata is assigned by the device to the image.

SUMMARY

This specification describes technologies relating to modifying time associated with digital media items. Digital cameras can capture digital media items, e.g., digital images, and associate metadata including a representative time, e.g., a time of capture, with each image. Software applications can receive the digital images from the digital camera along with the metadata and present the images on display devices. The representative time associated by the digital camera with an image can be based on the time settings of the camera. If the time settings of the camera are incorrect, then the representative time associated with all the images will also be incorrect. Regardless of the time associated with an image in a group of images, the relative time difference between the representative time associated with any two images in the group will be the same. By modifying the representative time associated with a selected image to a correct time, the time associated with all images can be modified based on the relative time difference between the selected image and remaining images in the group.

In one aspect, a computer-implemented method is described. The method includes displaying a plurality of content items in a user interface, each content item having an initial time value, receiving input to modify time values of the plurality of content items, receiving input of a new time value for a content item of the plurality of content items, determining a change amount value based on the difference between an initial time value of the content item and the new time value, and for each content item, modifying the initial time value to a different time value by applying the change amount value to the initial time value.

This, and other aspects can include one or more of the following features. Modifying the initial time value to a different time value by applying the change amount value to the initial time value can include shifting the initial time value of each content item by the change amount value. Shifting the initial time value of each content item by the change amount value can include adding the change amount value to the initial time value of each content item. The content can be an image. The initial time value of each content item can be received from a device on which each content item is stored. Each content item can be captured using the device. The method also includes determining that a time setting in the device is not accurate, and providing an indication that the time setting is not accurate. The method further includes transmitting instructions to modify the time setting to a correct time setting upon determining that the device can be configured. The initial time value can represent a time when the content item was captured. Modifying an initial time value corresponding to a content item to a different time value can include receiving the content item. Additional aspects can include implementing the subject matter in computer program products, tangibly embodied in computer-readable media, causing data processing apparatuses to perform operations described in the disclosure. Further aspects can include implementing the subject matter in a system including a processor and a computer program product encoding instructions to cause the processor to perform operations described in the disclosure.

In another aspect, a computer-implemented method is described. The method includes displaying multiple content items associated with multiple time values in a user interface, each content item corresponding to a time value, displaying multiple locations associated with the multiple content items in the user interface, each location corresponding to a content item, the multiple locations associated with a plurality of reference times, each location associated with a corresponding reference time, in response to input, moving a location of a content item to a new location, and based on a difference between a reference time corresponding to the new location and a time value associated with the moved content item, moving each remaining location corresponding to each remaining content item to a corresponding new location.

This, and other aspects, can include one or more of the following features. The content item can be an image. The method can further include shifting a time value of the moved content item by the difference. Moving each remaining location corresponding to each remaining content item to the corresponding new location can include shifting a time value of each remaining content item by the difference, identifying a new reference time corresponding to the time value shifted by the difference, and assigning the new location to be a location corresponding to the new reference time. The multiple reference times can be received from a source known to maintain accurate time. The source can be a global positioning system. The multiple content items can be received from a source. The method further includes associating a reference time corresponding to a location with a content item corresponding to the location. The method further includes receiving the input indicating that the location of the content item is inaccurate. Additional aspects can include implementing the subject matter in computer program products, tangibly embodied in computer-readable media, causing data processing apparatuses to perform operations described in the disclosure. Further aspects can include implementing the subject matter in a system including a processor and a computer program product encoding instructions to cause the processor to perform operations described in the disclosure.

Particular implementations of the subject matter described in this specification can be implemented to realize one or more of the following advantages.

The details of one or more implementations are set forth in the accompanying drawings and the description below. Other features, aspects, and advantages of the disclosure will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
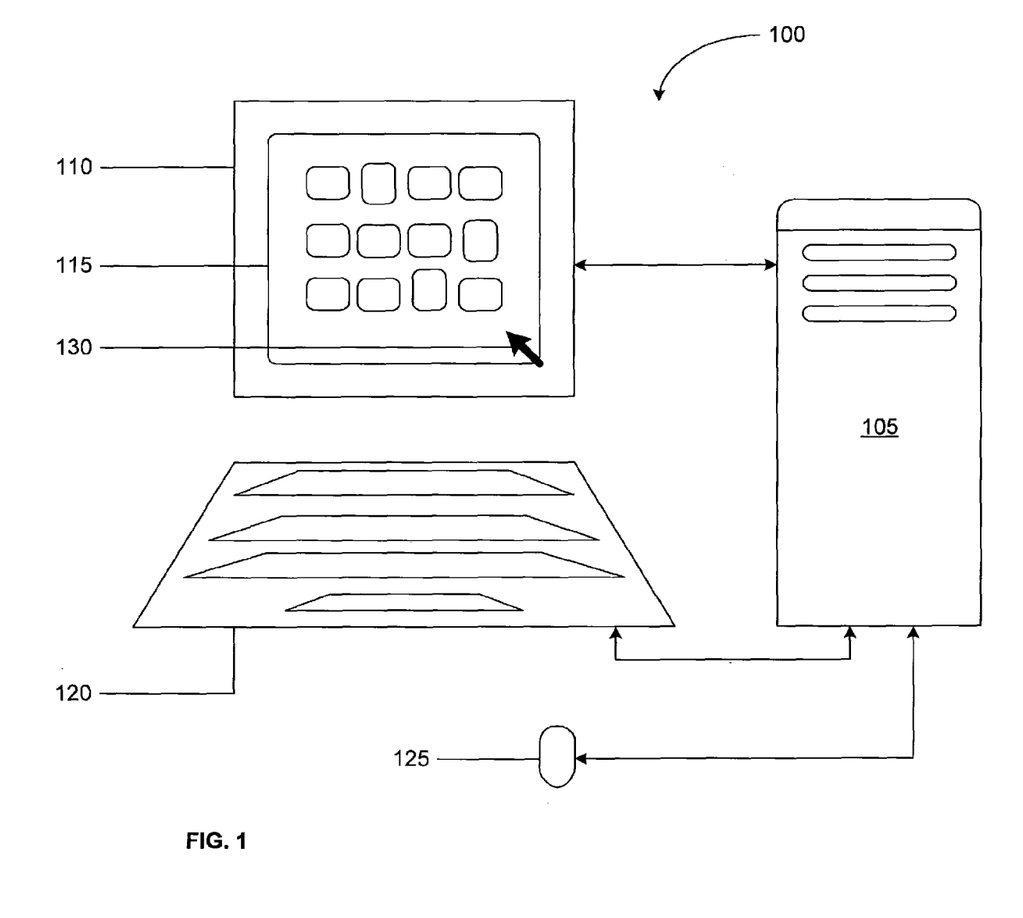
FIG. 1 is an example of a schematic of a system for editing digital media items.

FIG. 1 depicts a schematic of an example of a system 100 for editing digital media items, e.g., images, video, audio, and the like. The system 100 includes a computer 105 to receive digital media items from a source where the media items are stored, e.g., a digital camera, a memory card, and the like, and to present the received media items in a display device 110 operatively coupled to the computer 105. The system 100 can be any computer system such as a desktop computer, laptop computer, personal digital assistant (PDA), and the like. In addition to storing the media items, the source can also capture and store each media item's metadata, e.g., media item name, media item size (in kilobytes), a time when the media item was captured, and the like. Along with the media items, the computer 105 receives the associated metadata, and displays the media items in a user interface 115 in the display device. A user can interact with the user interface 115 using input devices, e.g., keyboard 120, pointing device 125, such as a mouse, and the like, to add, delete, edit, and manage the digital media items displayed in the user interface 115. For example, the user can provide input instructions using the input devices and view the outcome of the device in the display device 110.

In some implementations, the user selects one of the media items and modifies the time associated with the selected media item. In response, the time associated with all the media items is also modified based a relative time difference between time associated with the selected media item and those associated with the remaining media items. A user can provide input using the keyboard 120 and the pointing device 125 that controls a cursor 130, and can view the outcome of the input on the display device 105.

The computer 105 is configured to receive a computer-readable medium, e.g., a CD-ROM, tangibly embodying a computer program product, e.g., code related to a software application, where the computer program product includes instructions to perform operations. For example, the computer 105 can include a CD-ROM drive to receive the CD. The CD can be an installation disk that includes the instructions corresponding to the software application that enables editing and managing digital media items, e.g., images, video, audio, documents, and the like. The instructions in the computer program product cause the computer 105 to provide a user with the user interface 115 that allows the user to edit and manage the images. In other implementations, the software application can be downloaded to the computer 105 from a remote source, e.g., a server, to which the computer 105 is operatively coupled over one or more networks, e.g., the Internet.

Figure 2A:
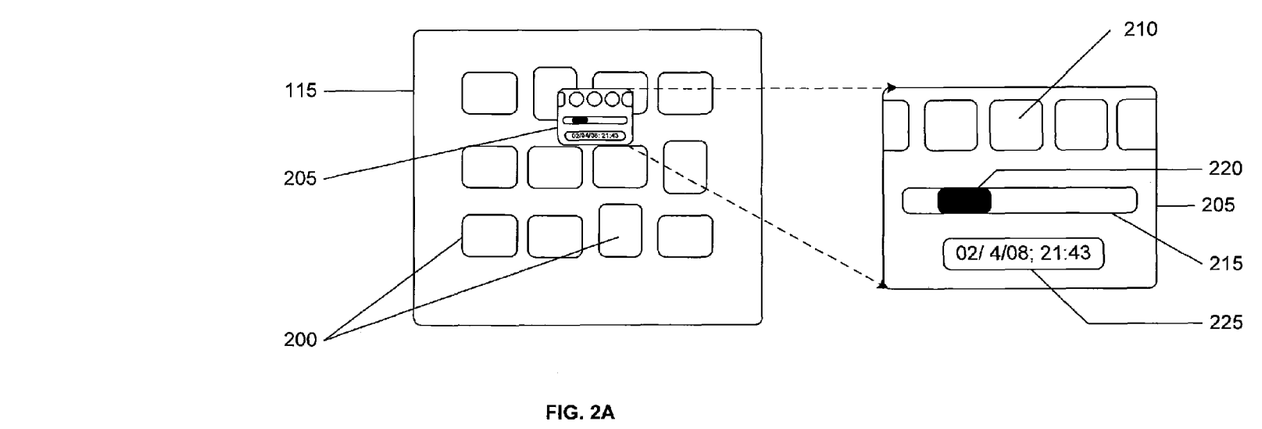
FIG. 2A is an example of a user interface for editing time associated with a digital image.

FIG. 2A is an example of a user interface 115 for editing time associated with a digital image. The user interface 115 can include one or more images 200 that were received from a source, e.g., a digital camera used to capture the images, a storage device used to store the images, and the like. The computer 105 can receive the metadata associated with the images and store both, the images and associated metadata, in a computer-readable memory. The computer 105 can request the source to provide the stored images or the source can transmit the images to the computer 105 once the source is operatively coupled to the computer 105. In some implementations, the metadata for the images can be received by the computer 105 before the images, and the computer 105 can associate each image with the corresponding metadata after the images are received. In other implementations, each image and it's corresponding metadata can be simultaneously received. In other implementations, the metadata of the images can be received after the images are received.

In the example user interface 115 shown in FIG. 2A, the images 200 can be arranged in rows and columns with some images displayed in landscape orientation and other images displayed in portrait orientation. In other example user interfaces 115, the images 200 can be displayed in any arrangement. Further, the user interface 115 can display only one image at a time based on user input.

The computer 105 can receive an input from an input device, e.g., a keyboard 120 or a pointing device 125, to select an image 200 and display a time associated with the selected image 200. The time associated with the selected image is included in the image metadata and represents a time when the image was captured. For example, the user interface 115 can include an icon (not shown) on which the user can position the cursor 130 and select the icon. In response, a control panel 205 can be displayed in the user interface 115, e.g., over a portion of the images 200 displayed in the user interface 115. Alternatively, the control panel 205 can be displayed in response to the user selecting a key on the keyboard 120. The control panel 205 can include thumbnails 210 of the images 200 displayed in the user interface 115 in a row. Because the row may not be sufficient to display all the images, the control panel 205 can include a slider 215 to bring thumbnails 210 into the viewable region of the control panel 205. Although the example shown in FIG. 2A illustrates a slider, any user interface control can be used to bring thumbnails 210 into the viewable region of the control panel 205 and to remove thumbnails 210 from the viewable region. The slider 215 can include a button 220 positioned within the slider 215 where a position of the button 220 within the slider 215 corresponds to a thumbnail 210 displayed in the control panel 205. The button 220 can be moved within the slider 215 such that as the slider is moved, e.g., from left to right, thumbnails 210 that are adjacent to a left edge of the control panel 205 are hidden from display and new thumbnails 210 are displayed near a right edge of the control panel 205. A similar effect can be displayed in the opposite direction when the button 220 is moved from right to left within the slider 215.

In some implementations, the user can select an image 200 in the user interface 115, and subsequently select an input to cause the control panel 205 to be displayed. In other implementations, the user can cause the control panel 205 to be displayed in the user interface 115, and subsequently select a thumbnail 210 of an image displayed in the control panel 205. In response to the selection, a text box 225 is displayed in the control panel 205 that displays a time associated with the selected image. For example, the time can be included in the image's metadata and can include a date, e.g., in mm/dd/yyyy format, and the time, e.g., in hours and minutes, format. The time can represent the time that the image 200 associated with the thumbnail 210 was captured and stored. Although the example shown in FIG. 2A illustrates that the text box 225 is displayed in the control panel 205, the text box 225 including the time can be displayed at any location within the user interface 115.

When two images are captured using, e.g., a digital camera, a time value representing a time when the image was captured is associated with each of the two images. Regardless of modifications to the time value at which each image was captured, the relative time represented by a difference between the time value of a first of the two images and a second of the two images will be the same. For example, if the first image was captured on May $1^{st}$ and the second image was captured on May $2^{nd}$, regardless of the month of capture, the relative time between the two images will be one day. Although the example cited represents a relative time of 1 day, based on features of the digital image used to capture the two images, the relative time can be smaller, e.g., in seconds.

Figure 2B:
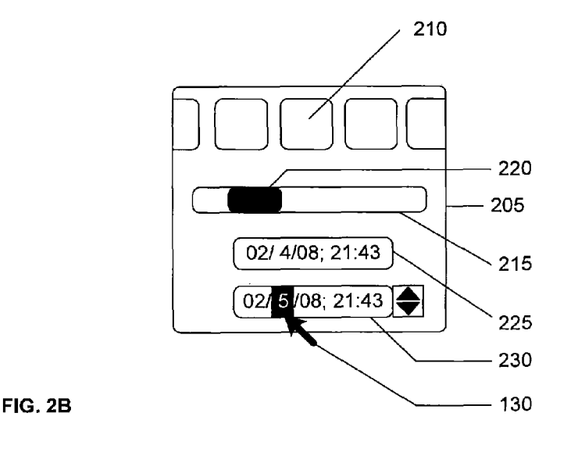
FIG. 2B is an example of a control panel for editing time associated with a digital image.

FIG. 2B depicts an example of a control panel 205 for editing time associated with a digital image. The user can view the selected images 200 and the time associated with any one of the selected images 200, either in the user interface 115 or in the control panel 205. The user can determine that the time associated with the image 200 does not match the time the image 200 was actually captured. One reason for this discrepancy can be that the time settings in the device used to capture the images are incorrect. Another reason can be that the user is in a different time zone compared to the time zone set in the digital camera. The computer 105 modifies the time associated with all the images 200 in response to the user modifying the time associated with one of the images 200.

In some implementations, the computer 105 can enable a user to select multiple images 200 displayed in the user interface 115. Subsequently, the computer 105 can display multiple thumbnails 210 in the control panel 205 in the user interface 115, where the thumbnails 210 are thumbnail images of the selected images 200. In a default view of the control panel 205, the text box 225 can display the time value associated with the first image of the multiple images 200. The button 220 in the slider 205 can be scrolled to the left or the right using the cursor 130 until a desired thumbnail 210 is displayed in the control panel 205. A desired image 200 can be selected using the pointing device 125 or the keyboard 120 or both. In response to the selection, the text box 225 can display the time value associated with the selected image. In some implementations, two text boxes 225 and 230 can be displayed when an image 200 is selected, both text boxes displaying the time value associated with the selected image 200. While the time value in text box 230 can be modified, the time value in text box 225 cannot be modified. One of the parameters of the time value, e.g., month, date, year, hour, minute, and the like, can be selected in text box 230. In response, the selected parameter can be highlighted and the user can modify the highlighted parameter.

In some implementations, up/down arrow keys can be displayed adjacent to the text box 230. After a parameter of the time value in the text box 230 is selected, the up/down arrow keys can be used to increase/decrease the time value parameter. For example, the user can select the date and select the up arrow key using the cursor 130 to increase the date from "4" to "5." Alternatively, the user can use the keyboard 120 to enter a time value parameter. In this manner, the user can be shown the original time value that was assigned to the selected image 200 in text box 225 and the new time value that will be assigned to the selected image 200 after the modification. The control panel 205 can include options for the user to accept or cancel the changes, e.g., "OK," "Cancel," buttons, and the like. In this manner, the user can change the time value associated with the selected image 200.

In other implementations, the control panel 205 can include one text box 225 that displays the time value associated with a selected image 200. When the user modifies the time value displayed in the text box 225 to a new time value, then a change amount value representing the difference in time values can be determined, and a message can be displayed in the user interface 115 informing the user that the time associated with all the selected images will be modified by the determined change amount value. In such implementations, only one text box 225 is used to both, display time associated with an image and enable a user to modify the displayed time.

When a group of images 200 are selected and a time value associated with one of the selected images 200 is modified to a different time value using the text box 230, then a difference between the different time value and the old time value is calculated. Subsequently, the time value of each remaining image in the group of images 200 is shifted by the difference. In some examples, the new time value can be greater than the old time value because the user determined that the selected image was captured at a time value later than the assigned time value. In such examples, the difference between the new and old time value can be positive, and the determined difference is added to the time value of each remaining image 200. In other examples, the new time value can be lesser than the old time value because the user determined that the selected image was captured at a time value prior to the assigned time value. In such examples, the difference between the new and old time value can be negative, and the determined difference is subtracted from the time value of each remaining image 200.

Figure 3:
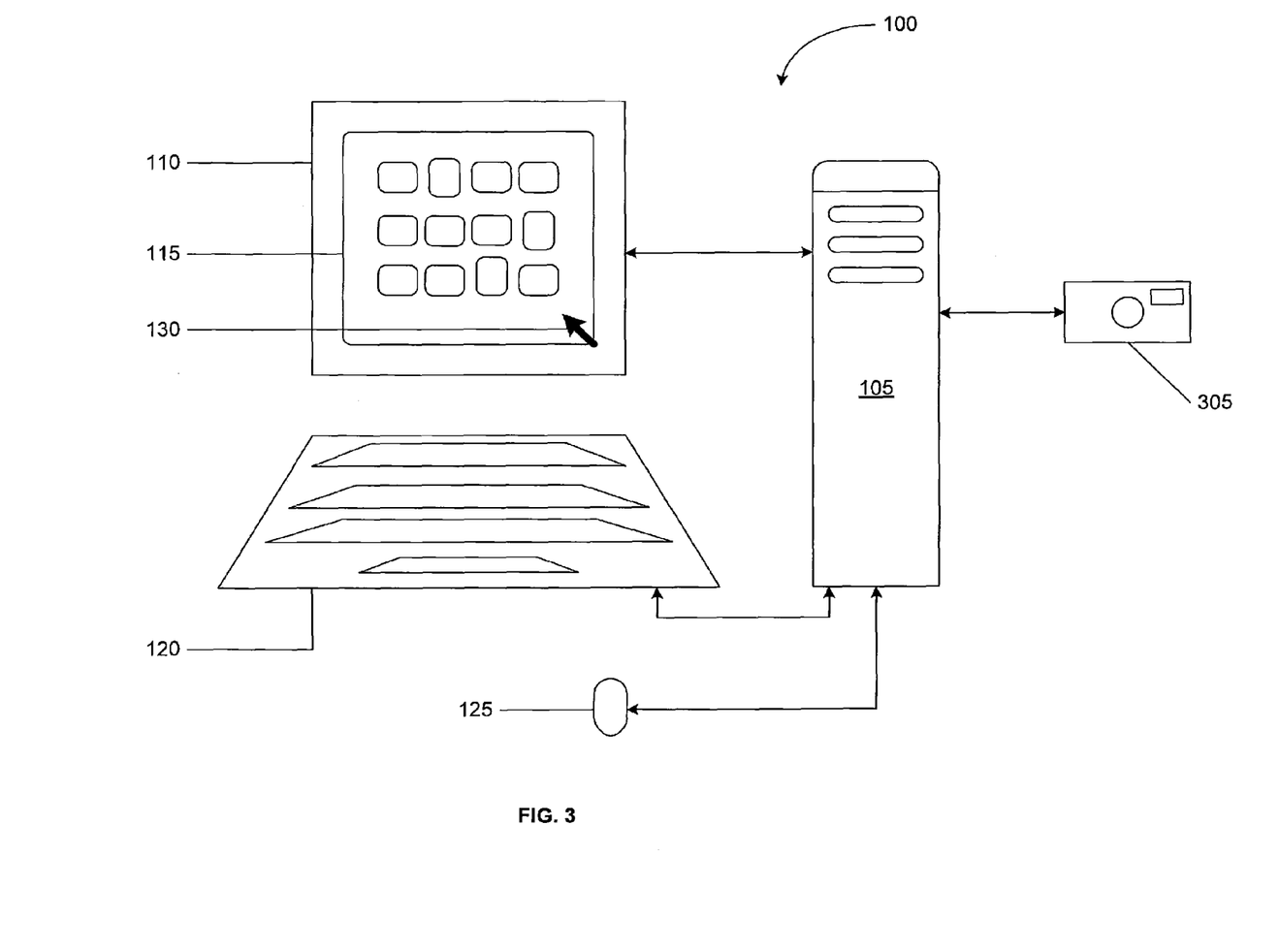
FIG. 3 is an example of a system operatively coupled to a device for capturing digital media items.

FIG. 3 depicts an example of a system 100 operatively coupled to a digital media item capturing device 305. In some implementations, the computer 105 can be operatively coupled to a digital media item capturing device 305, e.g., a digital camera. Digital cameras include memory cards on which captured images are stored in formats such as JPG, TIFF, and the like. When the digital camera is operatively coupled to the computer 105, e.g., using a Universal Serial Bus (USB) interface, the digital camera transfers the images to the computer 105.

Certain devices 305 that capture digital media allow a computer 105 to access the settings of the device 305 when the computer 105 and the device 305 are operatively coupled. For such devices 305, the computer 105 can determine a time setting of the device 305 and compare the time setting of the device 305 with a time setting of the computer 105. If the time setting of the device 305 is within a threshold of the time setting of the computer 105, e.g., within a 5 minute interval, then the computer 105 can determine that the time setting of the device 305 matches the time setting of the computer 105. If the difference between the time settings of the device 305 and the computer 105 is not within a threshold, then the computer 105 determines that the device 305 time settings are inaccurate, and informs a user of this discrepancy. For example, the computer 105 can cause a message to be displayed in the user interface 115 to indicate to the user that the device 305 time setting's are inaccurate. Some devices 305 may be configured to allow a computer 105 to which the devices 305 are coupled to manage the device 305. When the computer 105 detects a discrepancy between the computer 105 time setting and the device 305 time setting for such cameras, then the computer 105 can correct the device 305 time setting. Alternatively, the computer 105 can display a message in the user interface 115 informing the user of the inaccurate time setting of the device 305, and offer to correct the device 305 time setting for the user.

Figure 4:
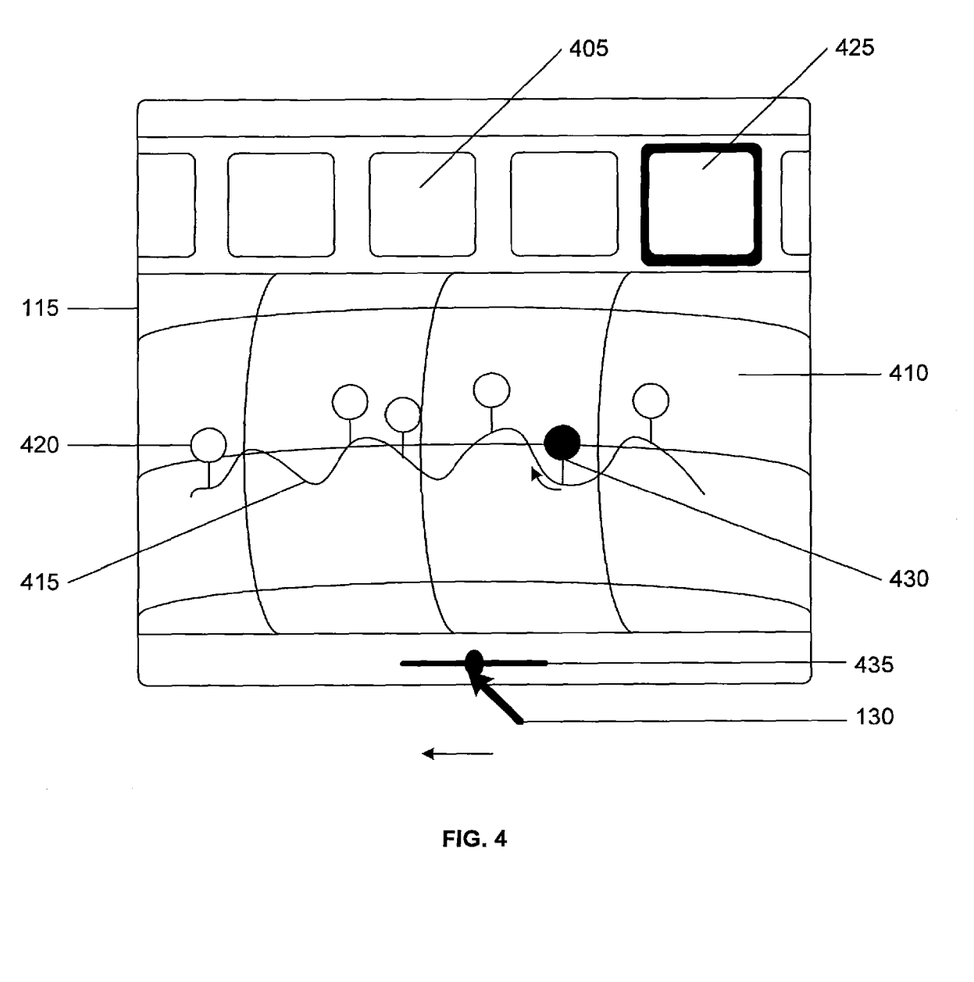
FIG. 4 is an example of a user interface including images and locations on a map where the images were captured.

FIG. 4 depicts an example of a user interface 115 including images, and objects representing the images positioned along a trajectory. In some implementations, the computer 105 can receive images and metadata associated with the images from a device, e.g., a digital camera. In addition, the computer 105 can receive location identifiers from a device, e.g., a Global Positioning System (GPS), and determine a path traveled by the digital camera. For example, a user may possess a digital camera and a GPS as the user travels along a path taking photographs. The path traveled by the user can be determined using data received from the GPS while the metadata associated with the images can be received from the digital camera. Thus, the computer 105 can receive the metadata for the images from the digital camera, and the locations for the images from a separate GPS. Subsequently, the computer 105 can identify and associate a corresponding location for each received image on the trajectory. Because a GPS receives time settings, e.g., based on GMT, from a satellite, the time setting in a GPS can be considered as a reference time against which time values associated with the received images can be compared.

The images 405 can be displayed in a row, e.g., adjacent to a top edge of the user interface 115. A slider (not shown) can be displayed adjacent to the row of images where the slider includes a button that can be moved using the cursor 130 to hide from and bring into display an image 405. The user interface 115 can include a representation of a map 410 and a trajectory 415 on the map 410 that represents a path along which the images 405 were captured. Multiple objects 420 representing the locations where the images 405 were captured can be displayed on the trajectory 415, where the positions of the objects 420 on the trajectory 415 can be determined based on the time values included in the metadata associated with the images 405.

One of the images 425 can be selected, e.g., using the cursor 130, and in response, the image 425 and the object 430 on the trajectory 415 corresponding to the selected image 425 can be displayed so as to be easily discerned, e.g., by a highlighting. If the difference in time setting between the camera and the GPS is within a threshold, e.g., 3 minutes, then the position of the object 430 on the trajectory will coincide with an actual location where the image 425 was captured. If the time setting in the device is inaccurate, then the time value associated with the images 405 received by the computer 105 will also be inaccurate, and the position of an image's object 430 on the trajectory 415 will not represent the location where the image was actually captured.

The user interface 115 can include a slider 435 with a button using which a user can move an image's object 430 to a new position on the trajectory 415, where the new position represents a correct location where the image was captured. Upon identifying that a location of the object 430 does not match the location where the image 425 was captured, the user can move the object 430 from the incorrect position on the trajectory 430 to a correct position using the slider 435. For example, if the user moves the button on the slider 435 to the left, the object 430 is moved to the left along the trajectory 415. Alternatively, the object 430 can be configured to enable the user to position the cursor 130 on the object 430 and move the object 430 along the trajectory 415. In this manner, the computer 105 enables a user to select any image's object 420 and move the selected object 420 along the trajectory 415.

The computer provides the user with an experience of changing a location of an image 405 to a new location by enabling a user to change the position of an object 420 on the trajectory 415. In addition, the computer 105 modifies the time value associated with the image 425 to a new time value determined based on the reference time associated with the new location to which the image's object 420 was moved. Thus, as the user moves the object 430 using the slider 435, the computer 105 determines a difference between the time value associated with the image 435 and the reference time associated with the new location, and adds the positive or negative difference, as the case maybe, to the time value of the image 435 included in the metadata. Further, the computer 105 modifies the time value associated with all the images 405 to obtain new time values by shifting the time values of the remaining images by the determined difference. Subsequently, the computer 105 changes the position of each object 420 on the trajectory 415 based on the corresponding shifted time values. In this manner, when the user modifies the position of one of the objects 430 on the trajectory 415, the time values of all the images 405 can be modified based on the difference between the time value of the image 425 corresponding to the object 430 and the reference time associated with a location to which the image 425 was moved. Further, based on the determined difference, the positions of the remaining objects 420 corresponding to the remaining images 405 on the trajectory 415 can also be moved.

Although the example trajectory 415 in FIG. 4 is curvilinear, the path traced by a user, and consequently, the trajectory 415 displayed in the user interface 115 can trace more complex patterns with one or more intersecting regions where the user has re-traced a previously traveled path. Further, although the relative time between any two images remains the same, the relative distance between two objects on the trajectory need not. For example, the user may have taken a first picture, walked for five minutes, taken a second picture, driven for five minutes, and taken a third picture. Although the relative time between the first and second pictures is equal to that between the second and third pictures, because the user walked and then drove, the relative distance between pictures may not be the same. In such instances, when the user moves an object representing a location on the user interface, the remaining objects on the trajectory may not be moved by an equal distance. Thus, the computer 105 can display a message to the user on the user interface 115 that if an object has not moved on the trajectory, that does not imply that the time associated with the corresponding image has not been changed.

Figure 5:
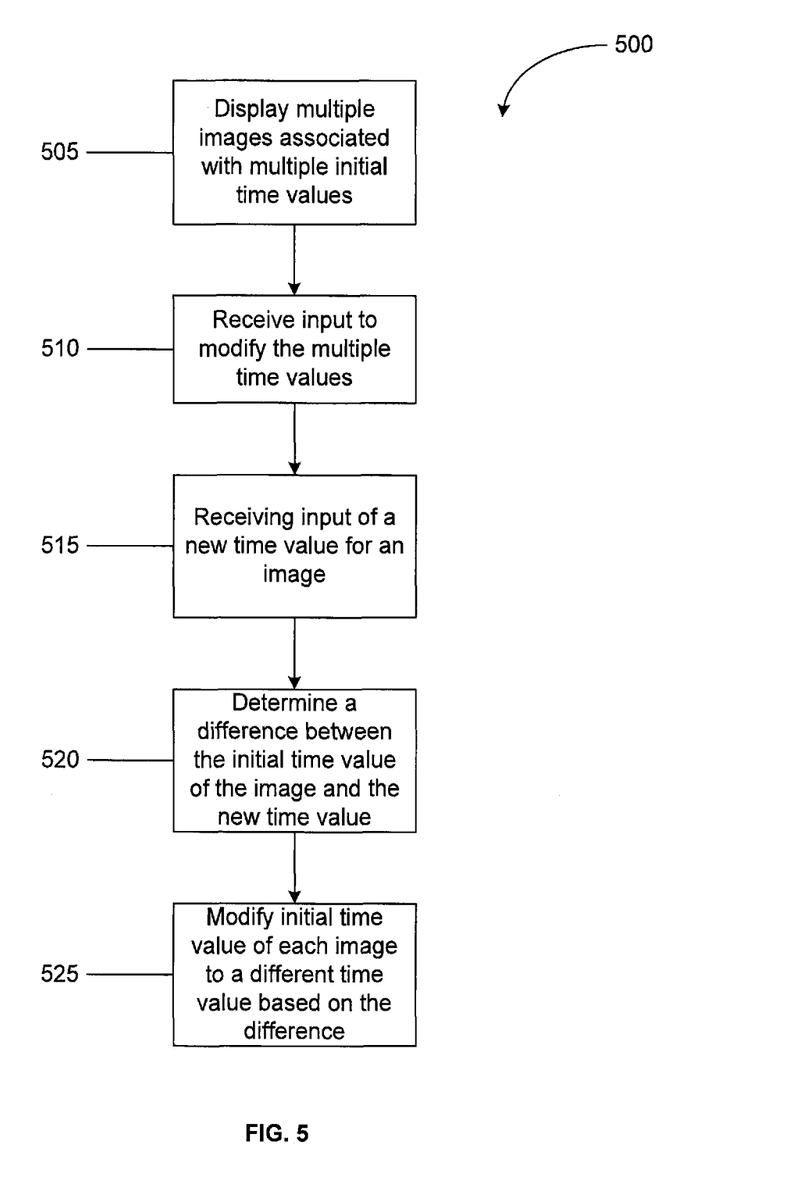
FIG. 5 is an example of a process for modifying time values associated with images.

FIG. 5 depicts an example of a process 500 for modifying time values associated with images. The process 500 can include displaying multiple images associated with multiple time values at 505. For example, the software application installed on the computer 105 can be configured to display multiple images received from a source, e.g., a digital camera, a storage device, and the like, in a user interface. In addition to the images, the source can store metadata associated with the images that includes a time value representing a time of capture with each captured image, where the time value is based on the device's time settings.

The process 500 can receive input to modify the multiple time values at 510. For example, the software application can be configured to receive user input to view the time value associated with a selected image of the multiple images. In response to the input, the software application can display a time value associated with the selected image in the user interface.

The process 500 can receive input of a new time value for an image at 515. For example, the software application can receive user input to modify the time value of one image to a new time value. The displayed time value can include date and time information, that a user can select, and modify. A user may modify the time value because the time value associated with the image does not match an actual time when the image was captured. One reason for this discrepancy may be because the time settings in the camera used to capture the images are inaccurate. Another reason may be because the camera is in a different time zone. A user can select, e.g., the date or the time or both, and modify the same using, e.g., a keyboard or any other input device.

The process 500 can determine a difference between the time value of the image and the new time value at 520. For example, the software application can display a first text box in which the original time value is displayed. The software application can display a second text box displaying the original time value, where each parameter of the time value in the second text box, e.g., date, time, and the like, can be altered by a user. Upon receiving the new time value from the user, the software application can calculate a difference between the new time value and the old time value to determine the difference.

The process 500 can modify initial time value of each image to a different time value based on the difference at 525. For example, if the user input requires that time values associated with a group of ten images be altered, then the software application can enable a user to modify a time value of one of the ten images to a new time value, and the software application can determine a difference between the new time value and the old time value. Subsequently, the software application can add the difference to the remaining time values of the nine remaining images, thereby modifying the time values of all ten images in the group.

Figure 6:
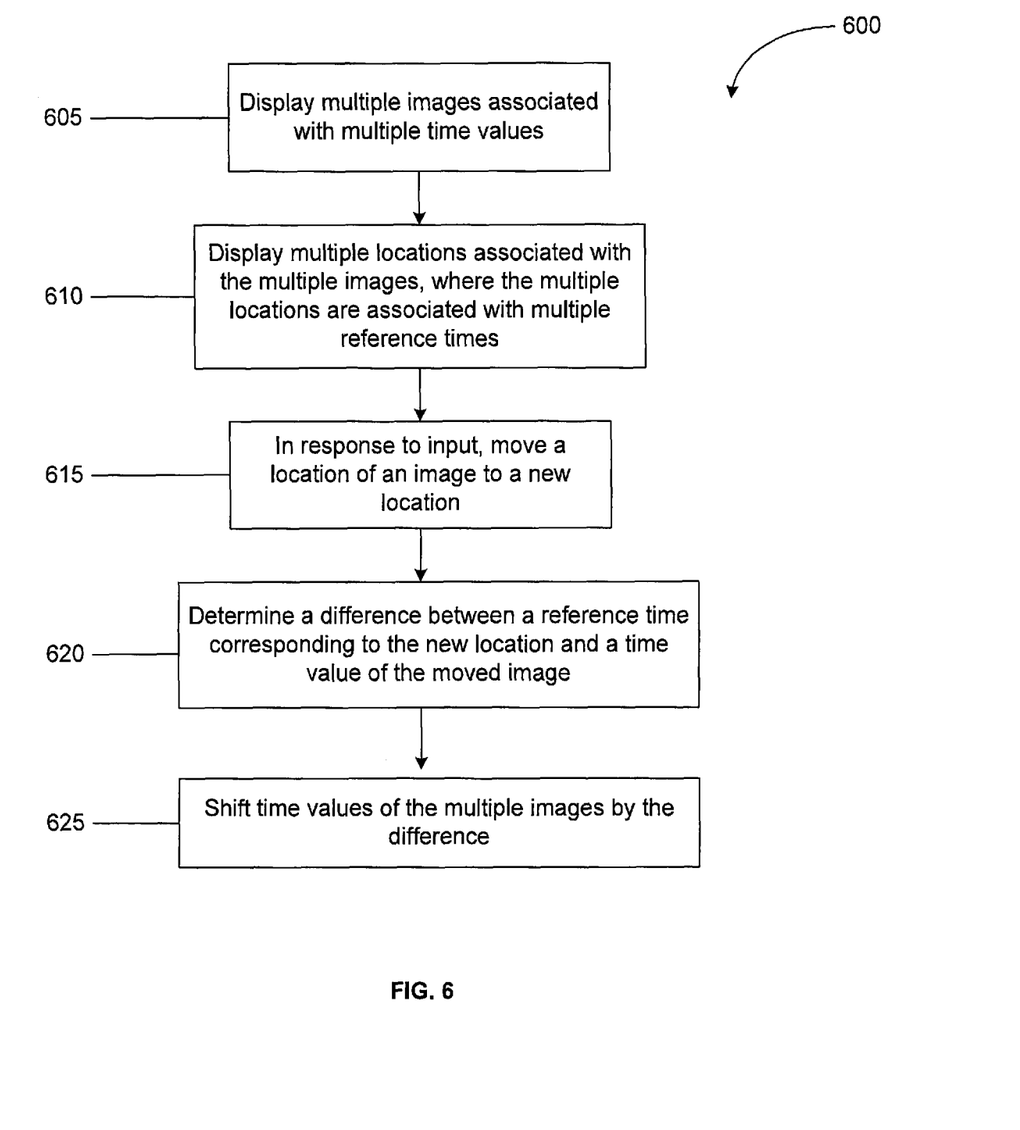
FIG. 6 is an example of a process for modifying locations associated with images.

FIG. 6 depicts an example of a process 600 for modifying locations associated with images. In some implementations, the software application can receive images and associated metadata, including time values representing when the images were captured, from a device, e.g., a camera. Further, the software application receive location information from a GPS or similar location identifier that identifies where the camera was when the images were captured. A user can walk along a path taking pictures which causes the camera to associate time values with each image and the GPS to capture location information to represent the path as a trajectory. The software application receives this information from both the camera and the GPS, and displays in the user interface, a trajectory indicating a path that a user traveled and objects on the trajectory that represent images that were captured.

The time settings of the camera may be inaccurate leading to incorrect time values being associated with each image. In such cases, an object representing an image with an inaccurate time value can be displayed at a position on the trajectory that is different from the position where the image was actually captured. Process 600 enables moving the object from the inaccurate location to the accurate location. In addition, process 600 corrects the inaccurate time value of the moved image as well as the time values of all the images represented on the trajectory.

The process 600 can display multiple images associated with multiple time values at 605. For example, the software application installed on the computer 105 can be configured to display multiple images received from a source, e.g., a digital camera, a storage device, and the like, in a user interface. In addition to the images, the source can store metadata associated with the images. The device used to capture the image can associate a time value representing a time of capture with each captured image. The time value is based on the device's time settings.

The process 605 can display multiple locations associated with the multiple images, where the multiple locations are also associated with multiple reference times at 610. For example, the software application can be configured to display, in the user interface, a representation of a map including a trajectory representing a path along which the user traveled while capturing images. The software application can receive location information from a location identifier, e.g., GPS, and determine the trajectory based on the location information. In addition, the software application can associate a location on the trajectory with an image, where a location represents where a corresponding image was captured. Because the GPS receives time settings from a satellite, each location on the image can be associated with a reference time.

The process 600 can move a location of an image to a new location, in response to input, at 615. For example, a user can view the location where an object is displayed, determine that the image was captured at a location other than where the object is displayed, and provide input to move the object to a new location. In some implementations, the software application can provide a user interface control, e.g., a slider, that allows a user to move a previously selected object along the trajectory.

The process 600 can determine a difference between a reference time corresponding to a new location to which the image's object is moved and a time value included in the image's metadata at 620. For example, the software application can detect the new position on the trajectory where the object associated with the image is positioned and can determine a reference time associated with the new position based on the time settings obtained from the GPS. The software application can calculate a difference between the time value associated with the image that was included in the image's metadata and the reference time corresponding to the new position to which the object representing the image is moved.

The process 600 can shift time values of the multiple images by the difference at 625. For example, the software application can add the calculated difference to remaining time values of each of the remaining images to corresponding new time values, and associate the new time values with the corresponding images. In this manner, the software application can correct the time values associated with a group of images when a user corrects the time value associated with one of the images in the group. Further, the software application can determine a new location on the trajectory corresponding to each of the new time values, and move the objects representing each image to the new location. In this manner, the software application can enable a user to correct inaccurate time values associated with a group of images, and update a map displaying the locations of the images.

Although the present disclosure uses digital images as an example of digital media items, the methods and techniques described herein can be applied to any digital media item, e.g., video clips, audio files, documents, and the like.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or near-touch input where input is recognized without the user making contact with, e.g., a screen.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results. In some implementations, the device where the images are stored can be a remote location that is operatively coupled to the computer 105 over one or more networks. The images can be received from the remote location over the networks. In other implementations, the computer 105 can be located at a remote location operatively coupled to the display device and the input devices over one or more networks. A user can transmit the images, the metadata, and the location information to the computer system 105 over the one or more networks. Further, a user can interact with a user interface provided by the computer 105 over the one or more networks.

In some implementations, the user interface can display an object, e.g., a rectangular frame, that represents an album including multiple images. To change the time values associated with each of the images in the album, the user can select the object representing the album. In response, the user interface can display a text box displaying the time value of one of the images, e.g., a first image, in the album. When the user changes the time value in the text box, the time values associated with the remaining images in the text box can be changed. In some implementations, one of the images in the album can be displayed within the rectangular frame representing the album. In some implementations, as the user skims the cursor across the object, the thumbnail displayed within the object can be updated. The user can select one of the thumbnail images, and in response, the time value associated with the selected image can be displayed, allowing a user to change the time value.

What is claimed is:

1. A computer-implemented method comprising:
    receiving a plurality of geographical locations, wherein each geographical location is associated with a reference time;
    displaying, in a user interface, a trajectory that connects the plurality of geographical locations according to the associated reference times;
    receiving a plurality of content items associated with a plurality of time values;
    displaying a representation of each of the plurality of content items on the trajectory, wherein a displayed position of each content item's representation on the trajectory is determined based on a time value associated with the content item;
    in response to input, moving a content item's representation to a new position on the trajectory, wherein the new position represents a new geographical location; and
    based on a difference between a reference time corresponding to the new geographical location represented by the new position and a time value associated with the content item corresponding to the moved representation, moving one or more additional content items' representations to new positions on the trajectory.

2. The method of claim 1, wherein the content item is an image.

3. The method of claim 1, further comprising shifting a time value of the content items corresponding to the moved representations by the difference.

4. The method of claim 1, wherein moving one or more additional content items' representations comprises:
    for each of the one or more additional content items:
        shifting a time value of the content item by the difference;
        identifying a new reference time corresponding to the time value shifted by the difference;
        identifying a new location to which the new reference time is associated;
        assigning the new location to be a location corresponding to the new reference time; and
        displaying the content item's representation at the new location on the trajectory.

5. The method of claim 1, further comprising receiving the plurality of reference times from a source known to maintain accurate time.

6. The method of claim 5, wherein the source is a global positioning system.

7. The method of claim 1, further comprising receiving the plurality of content items from a source.

8. The method of claim 7, further comprising associating a reference time corresponding to a location with a content item corresponding to the location.

9. The method of claim 1, wherein the input indicates that an original position of the content item's representation is an inaccurate representation of an actual location corresponding to the content item.

10. A computer program product, tangibly embodied on a computer-readable medium, the computer program product causing data processing apparatus to perform operations comprising:
    receiving a plurality of geographical locations, wherein each geographical location is associated with a reference time;
    displaying, in a user interface, a trajectory that connects the plurality of geographical locations according to the associated reference times;
    receiving a plurality of content items associated with a plurality of time values;
    displaying a representation of each of the plurality of content items on the trajectory, wherein a displayed position of each content item's representation on the trajectory is determined based on a time value associated with the content item;
    in response to input, moving a content item's representation to a new position on the trajectory, wherein the new position represents a new geographical location; and
    based on a difference between a reference time corresponding to the new geographical location represented by the new position and a time value associated with the content item corresponding to the moved representation, moving one or more additional content items' representations to new positions on the trajectory.

11. The computer program product of claim 10, wherein the content item is an image.

12. The computer program product of claim 10, the operations further comprising shifting a time value of the content items corresponding to the moved representations by the difference.

13. The computer program product of claim 10, wherein moving one or more additional content items' representations comprises:
    for each of the one or more additional content items:
        shifting a time value of the content item by the difference;
        identifying a new reference time corresponding to the time value shifted by the difference;
        identifying a new location to which the new reference time is associated;
        assigning the new location to be a location corresponding to the new reference time; and
        displaying the content item's representation at the new location on the trajectory.

14. The computer program product of claim 10, the operations further comprising receiving the plurality of reference times from a source known to maintain accurate time.

15. The computer program product of claim 14, wherein the source is a global positioning system.

16. The computer program product of claim 10, the operations further comprising receiving the plurality of content items from a source.

17. The computer program product of claim 16, the operations further comprising associating a reference time corresponding to a location with a content item corresponding to the location.

18. The computer program product of claim 10, wherein the input indicates that an original position of the content item's representation is an inaccurate representation of an actual location corresponding to the content item.

19. A system comprising:
a processor; and
a computer program product, tangibly embodied in a computer-readable medium, the computer program product encoding instructions to cause the processor to perform operations comprising:
receiving a plurality of geographical locations, wherein each geographical location is associated with a reference time;
displaying, in a user interface, a trajectory that connects the plurality of geographical locations according to the associated reference times;
receiving a plurality of content items associated with a plurality of time values;
displaying a representation of each of the plurality of content items on the trajectory, wherein a displayed position of each content item's representation on the trajectory is determined based on a time value associated with the content item;
in response to input, moving a content item's representation to a new position on the trajectory, wherein the new position represents a new geographical location; and
based on a difference between a reference time corresponding to the new geographical location represented by the new position and a time value associated with the content item corresponding to the moved representation, moving one or more additional content items' representations to new positions on the trajectory.

20. The system of claim 19, wherein the content item is an image.

21. The system of claim 19, the operations further comprising shifting a time value of the content items corresponding to the moved representations by the difference.

22. The system of claim 19, wherein moving one or more additional content items' representations comprises:
for each of the one or more additional content items:
shifting a time value of the content item by the difference;
identifying a new reference time corresponding to the time value shifted by the difference;
identifying a new location to which the new reference time is associated;
assigning the new location to be a location corresponding to the new reference time; and
displaying the content item's representation at the new location on the trajectory.

23. The system of claim 19, the operations further comprising receiving the plurality of reference times from a source known to maintain accurate time.

24. The system of claim 23, wherein the source is a global positioning system.

25. The system of claim 19, the operations further comprising receiving the plurality of content items from a source.

26. The system of claim 25, the operations further comprising associating a reference time corresponding to a location with a content item corresponding to the location.

27. The system of claim 19, wherein the input indicates that an original position of the content item's representation is an inaccurate representation of an actual location corresponding to the content item.

* * * * *